2,905,718

SURFACE-ACTIVE ACETALS AND FORMALS

Peter L. de Benneville and Homer J. Sims, Philadelphia, Pa., assignors to Rohm & Haas Company, Philadelphia, Pa., a corporation of Delaware No Drawing. Application September 24, 1957
Serial No. 685,790

13 Claims. (Cl. 260—609)

The present invention concerns specific surface-active acetals and formals. It is further concerned with specific surface-active acetals and formals that are stable under alkaline or neutral conditions but which may be altered by acidic conditions. This alteration may take the form of changing an oil-soluble, surface-active compound to one of no surface activity or a water-soluble, surface-active compound to one of no surface activity. This invention also concerns a method for the preparation of the specific surface-active acetals and formals.

A wide variety of non-ionic surface-active agents is known in the art and usually these are stable in acid, basic, and neutral media. In many applications it is necessary or at least highly desirable to remove or change the surface activity of an agent at some critical point in the operation. For example, if an ordinary non-ionic surface-active agent is used to remove oils and waxes from raw wool by emulsification, there is obtained an emulsion in water which is not easily broken, either for the recovery of the oils and waxes or purposes of disposal. Also, the effluent from commercial laundries using non-ionic detergents remains highly surface active causing many troublesome problems of foaming and disposal. Further, when non-ionic surface-active agents are used for the recovery of petroleum, there is obtained an emulsion which is not easily broken without the use of certain complex and expensive demulsifying agents. The present compounds can be used in all of the above situations by employing a step in which the objectionable emulsions are treated with dilute acids which, since there is an alteration in the surface-active properties of the present compounds, permits the ready and effective conclusion of the operations described heretofore. The subject compounds may also be used in the preparation of emulsion polymers which can later be coagulated if desired in fiber form by treatment with dilute acids. The present compounds are useful general purpose detergents that exhibit low foam, good detergency, and high cloud points.

The acid-sensitive non-ionic surface-active acetals and formals of this invention may be represented by the formula

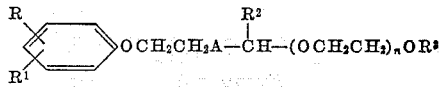

in which R and R$^1$ represent a hydrogen atom or an alkyl group and together contain from 8 to 24 carbon atoms, R$^2$ is a hydrogen atom or a methyl group, R$^3$ is a lower alkyl group, A is a chalcogen having an atomic weight of 16 to 32, i.e., oxygen or sulfur, and $n$ is an integer from 3 to about 50. R and R$^1$ as alkyl groups may be octyl, nonyl, decyl, dodecyl or the like. R and R$^1$ in their alkyl form may be the same or different as desired as long as the range of carbon atoms previously stated is adhered to. The R and R$^1$ alkyl groups may be located at any possible position on the benzene ring. When either R or R$^1$ is hydrogen the other may be located at any possible position on the benzene ring, the para position with respect to the ether chain being preferred. R and R$^1$ as alkyl groups may exhibit any of the known spatial configurations such as normal, iso, or tertiary. Particularly useful are compounds in which either R or R$^1$ is hydrogen and the other is octyl, nonyl, or dodecyl. Also useful when both R and R$^1$ are alkyl groups are the representations dibutyl, dipentyl, dihexyl, dioctyl, dinonyl, or didodecyl.

R$^2$ has been stated as representing a hydrogen atom or a methyl group. When R$^2$ represents hydrogen a formal structure is obtained and when R$^2$ represents a methyl group an acetal structure is obtained.

R$^3$ is a lower alkyl group containing from 1 to 4 carbon atoms and may be represented by methyl, ethyl, isoproproyl, tert-butyl, and the like.

The integer $n$ varies from 3 to about 50. When $n$ ranges from about 3 to 5, the product is substantially oil soluble, and when $n$ ranges from 6 to about 50, the product is substantially water soluble.

The present compounds are preferably prepared by reacting a compound having the formula

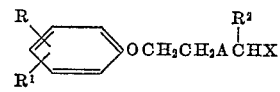

with one having the formula

in which X is chlorine or bromine. The reaction is conducted in the presence of a strongly basic inorganic neutralizing agent. Among the basic agents that may be employed are the alkali metals, such as sodium and potassium, the alkali metal hydroxides, such as sodium hydroxide, potassium hydroxide, or lithium hydroxide, alkaline earth metal hydroxides, such as barium hydroxide, calcium hydroxide, and strontium hydroxide, alkali metal carbonates such as sodium carbonate and potassium carbonate, and the like. The basic agent should be present in an amount somewhat greater than an equivalent amount of the reactants in order to assure the complete neutralization of the hydrochloric or hydrobromic acid formed in the reaction.

As an alternative method for preparing members having acetal structures, there may be used a reaction between a specific vinyl ether with a defined alcohol in the presence of an acidic catalyst. In this instance the reactants may be represented by the formulas

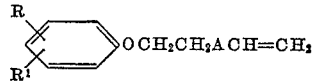

and

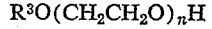

and the acidic catalysts may be typically concentrated hydrochloric acid, concentrated sulfuric acid, syrupy phosphoric acid, boron trifluoride, or boron trifluoride coordinated complexes.

The compounds of this invention are prepared by conducting the reaction in the temperature range of about 40° to 100° C., preferably 50° to 70° C. When a halogenated reactant is employed the reaction is exothermic in nature. It is preferable to add to the reaction system the alcohol reactant and the acidic catalyst or basic agent, as the case may be, and then introduce the other reactant, the vinyl ether or the halogenated compound, as the case may be. Such a procedure assures a maximization of yields and minimization of undesired side reactions. Reaction time is not critical but generally will vary from about 30 minutes to ten hours or more depending largely on the individual reactants employed. A solvent is not required in this reaction but sometimes, in order to aid in the separation of the inorganic salt by-product formed when the halogenated reactant is employed, it may be advantageous to employ a volatile inert organic solvent such as benzene, toluene, or the like.

Typical reactants that may be employed include:

$C_8H_{17}C_6H_4OCH_2CH_2OCH_2Cl$
$C_9H_{19}C_6H_4OCH_2CH_2OCH_2Br$ $$C_{10}H_{21}C_6H_4OCH_2CH_2S\overset{CH_3}{\underset{|}{C}}HBr$$

$(C_5H_{11})_2C_6H_3OCH_2CH_2OCH_2Cl$
$(C_8H_{17})_2C_6H_3OCH_2CH_2SCH_2Cl$
$(C_9H_{19})_2C_6H_3OCH_2CH_2OCH_2Cl$ $$(C_{12}H_{25})_2C_6H_3OCH_2CH_2O\overset{CH_3}{\underset{|}{C}}HCl$$

$C_{12}H_{25}C_6H_4OCH_2CH_2OCH_2Cl$
$C_{14}H_{29}C_6H_4OCH_2CH_2OCH_2Br$
$C_{18}H_{37}C_6H_4OCH_2CH_2OCH_2Cl$
$(C_8H_{17})(C_{12}H_{25})C_6H_3OCH_2CH_2SCH_2Cl$ $$(C_9H_{19})(C_{10}H_{21})C_6H_3OCH_2CH_2O\overset{CH_3}{\underset{|}{C}}HBr$$

$CH_3O(CH_2CH_2O)_3H$
$C_2H_5O(CH_2CH_2O)_5H$
$C_2H_5O(CH_2CH_2O)_9H$
$CH_3O(CH_2CH_2O)_{15}H$
$CH_3O(CH_2CH_2O)_{20}H$
$C_2H_5O(CH_2CH_2O)_{30}H$
$C_3H_7O(CH_2CH_2O)_{40}H$
$C_4H_9O(CH_2CH_2O)_{50}H$
$CH_3O(CH_2CH_2O)_{50}H$
$C_8H_{17}C_6H_4OCH_2CH_2OCH=CH_2$
$C_{12}H_{25}C_6H_4OCH_2CH_2OCH=CH_2$
$(C_9H_{19})_2C_6H_3OCH_2CH_2OCH=CH_2$
$(C_8H_{17})(C_{12}H_{25})C_6H_3OCH_2CH_2SCH=CH_2$

The reactants of this invention are known compounds or readily prepared by known methods. In the preparation of the ethoxy-alcohol reactants having 3 to 50 ethoxy units there is frequently obtained a mixture of compounds having different numbers of ethoxy units. This is known in the art and is no deterrent to the present reaction since satisfactory and useful compounds are formed from the mixtures of compounds in the same way as the individual compounds. It is to be understood, therefore, that the integer $n$ stands for either the number of ethoxy units in a single compound or an average value in a mixture of compounds.

At the conclusion of the reaction, if a halogenated reactant is used, the halide salt formed as a reaction by-product is removed by filtration. The product is obtained as the filtrate. If a solvent has been employed, as indicated previously, it may be removed by stripping in a conventional manner. Even if a solvent has not been employed during the course of the reaction, the use of one is often advantageous in the isolation of the product in order to facilitate the removal of the inorganic halide salt formed. When a vinyl ether reactant is used, the reaction medium is neutralized at the conclusion of the reaction by the addition of sodium hydroxide or the like. The resulting neutralization product may be removed by filtration, if desired, but since the amount of such is relatively small and does not interfere with the desired product, no further operations of isolation are usually conducted.

The products of this invention, having the utilities previously stated, possess the hydrophobic-hydrophilic balance required for a substance to exhibit surface activity. As has been presented previously, it is frequently desirable to employ a surface-active material at one stage of a process and not have such material interfere at a later stage of the process as has been outlined heretofore. The present compounds may be used as valuable surface-active agents at one stage of a process and then chemically altered to lose surface-activity at a later stage of the process. The present compounds are quite stable in alkaline or neutral media, but may be chemically altered in an acidic media particularly at temperatures approaching about 100° C. Hydrochloric acid or the like is particularly convenient and effective for use in this respect and the change is effected usually in a manner of minutes, such as 5 or 10, depending largely on the temperatures and compounds involved. The present compound is split into three fragments, one an oily water insoluble compound, one an ether alcohol and a third a volatile aldehyde, none of which is surface active. Therefore, a compound is available that is surface-active during its period of use when surface-activity is demanded and which can be readily altered to yield compounds that are no longer surface-active and that can be readily disposed of when such conditions are required.

The compounds of this invention, as well as the methods for their preparation, may be more fully understood from the following examples which are offered by way of illustration and not by way of limitation. Parts by weight are used throughout.

Example 1

There are introduced into a reaction vessel 16 parts of pulverized potassium hydroxide and 121 parts of $CH_3O(CH_2CH_2O)_9H$. There is then slowly added 72 parts of chloromethyl octylphenoxyethyl ether over a period of one and one-half hours. The temperature of the system gradually rises to about 55° C. The mixture is allowed to stand overnight and it is then filtered. The filtrate is water soluble, surface-active, and corresponds to the formula $C_8H_{17}C_6H_4OCH_2CH_2OCH_2O(CH_2CH_2O)_9CH_3$ In a similar manner there are prepared $C_8H_{17}C_6H_4OCH_2CH_2OCH_2O(CH_2CH_2O)_{15}CH_3$ $C_8H_{17}C_6H_4OCH_2CH_2OCH_2O(CH_2CH_2O)_{20}CH_3$ and $C_8H_{17}C_6H_4OCH_2CH_2OCH_2O(CH_2CH_2O)_{30}CH_3$

Example 2

There are introduced into a reaction vessel 3.6 parts of pulverized potassium hydroxide and 89 parts of $CH_3O(CH_2CH_2O)_{40}H$. The mixture is heated to 50° C. and then 15.8 parts of octylphenoxyethyl chloromethyl ether is added over a period of 40 minutes at 40° to 50° C. The mixture is then heated for two and one-half hours at 60° to 70°. The product is water soluble and surface-active. The product corresponds to octylphenoxyethoxy methoxytetracontaethoxy methane and may be represented by the formula $C_8H_{17}C_6H_4OCH_2CH_2OCH_2O(CH_2CH_2O)_{40}CH_3$ In a similar manner there are prepared $C_{12}H_{25}C_6H_4OCH_2CH_2SCH_2O(CH_2CH_2O)_{25}C_2H_5$ $(C_9H_{19})_2C_6H_3OCH_2CH_2OCH_2O(CH_2CH_2O)_{35}C_3H_7$ and $C_{18}H_{37}C_6H_4OCH_2CH_2OCH_2O(CH_2CH_2O)_{50}C_4H_9$

Example 3

Into a reaction vessel there are placed 16 parts of potassium hydroxide and 121 parts of $CH_3(OCH_2CH_2)_{10}OH$. There is then added slowly 78.1 parts of α-chloroethyl octylphenoxyethyl ether, while the mixture is being stirred and heated to about 50° C. The temperature is then increased to 60° to 70° C. for about one hour. The product is filtered and the filtrate is surface-active. The product corresponds to the formula $$C_8H_{17}C_6H_4OCH_2CH_2O\overset{}{\underset{|}{C}}HO(CH_2CH_2O)_{10}CH_3$$
$$\text{CH}_3$$

In a similar manner there are prepared

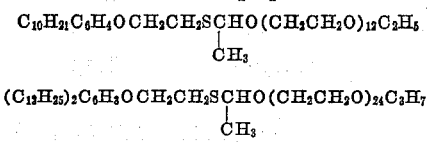

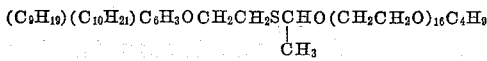

and

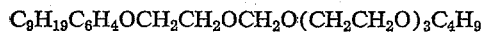

Example 4

There are introduced into a reaction vessel 32 parts of pulverized potassium hydroxide and 103 parts of $C_4H_9O(CH_2CH_2O)_3H$. To this is slowly added 156 parts of chloromethyl nonylphenoxyethyl ether over a period of 1½ hours. The reaction is exothermic in nature and is allowed to proceed until no more heat is evolved. The reaction mixture is heated at 50° for 1 hour then allowed to stand overnight. It is diluted with 200 parts of toluene and filtered. The toluene is then removed from the filtrate in vacuo and there is obtained 220 parts of a light yellow oil corresponding in analysis to the formula $$C_9H_{19}C_6H_4OCH_2CH_2OCH_2O(CH_2CH_2O)_3C_4H_9$$

In a similar manner there are prepared

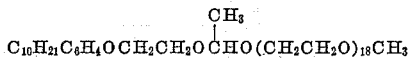

and

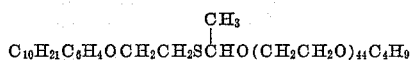

Example 5

To 46 parts of $CH_3O(CH_2CH_2O)_9H$ is added dropwise sufficient concentrated hydrochloric acid to bring the pH value to 2. To this is added dropwise with stirring 33 parts of nonylphenoxyethyl vinyl ether over a period of 1 hour at steam bath temperature. The pH is checked at intervals during the addition period and when necessary more acid is added to maintain the acidity at a level of pH of about 2. After heating and stirring for two hours, the mixture is made basic with the addition of about 10 drops of aqueous 50% sodium hydroxide solution. The product, which corresponds to the formula

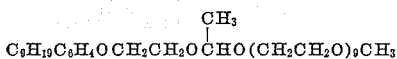

is water-soluble and gives a clear aqueous 1% solution with a cloud point of about 50° C. When a solution containing 1% of the material is acidified and heated to 60° C. for a few minutes, acetaldehyde is liberated and nonylphenoxyethanol is obtained as an oil.

In a similar manner from dodecylphenoxyethyl vinyl ether there is prepared

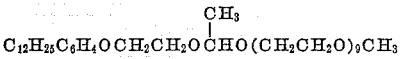

Following the above procedure with the substitution of concentrated sulfuric acid for concentrated hydrochloric acid, the same product is obtained.

Example 6

To 21 parts of $C_4H_9O(CH_2CH_2O)_3H$ is added 0.5 part of boron trifluoride by absorbing this amount of the gas in the liquid. To this is added over a period of 1 hour dropwise with stirring, 33 parts of diamylphenoxyethyl vinyl ether. The solution is allowed to stand overnight. The product corresponds to

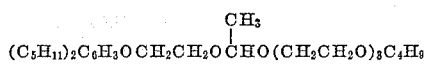

The product is an oil-soluble liquid which when added to hydrocarbon oils promotes their emulsification in water.

We claim:

1. A composition of matter having the formula

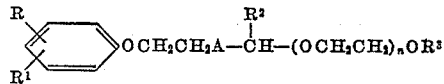

in which R and $R^1$ are members from the group consisting of a hydrogen atom and an alkyl group and together contain from 8 to 24 carbon atoms, $R^2$ is a member of the group consisting of a hydrogen atom and a methyl group, $R^3$ is a lower alkyl group, A is a chalcogen having an atomic weight of 16 to 32, and $n$ is an integer of 3 to about 50.

2. A composition of matter having the formula

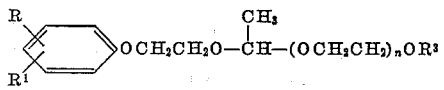

in which R and $R^1$ are alkyl groups containing together from 8 to 24 carbon atoms, $R^3$ is a lower alkyl group, and $n$ is an integer of 3 to about 50.

3. A composition of matter having the formula

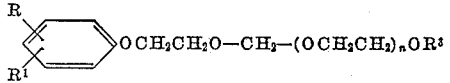

in which R and $R^1$ are alkyl groups containing together from 8 to 24 carbon atoms, $R^3$ is a lower alkyl group, and $n$ is an integer of 3 to about 50.

4. A composition of matter having the formula

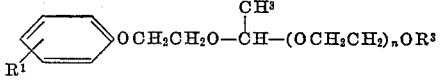

in which $R^1$ is an alkyl group of 8 to 24 carbon atoms, $R^3$ is a lower alkyl group, and $n$ is an integer of 3 to about 50.

5. A composition of matter having the formula

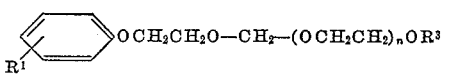

in which $R^1$ is an alkyl group of 8 to 24 carbon atoms, $R^3$ is a lower alkyl group, and $n$ is an integer of 3 to about 50.

6. A composition of matter having the formula

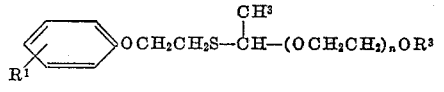

in which $R^1$ is an alkyl group of 8 to 24 carbon atoms, $R^3$ is a lower alkyl group, and $n$ is an integer of 3 to about 50.

7. A composition of matter having the formula $$C_8H_{17}C_6H_4OCH_2CH_2OCH_2O(CH_2CH_2O)_9CH_3$$

8. A composition of matter having the formula $$C_8H_{17}C_6H_4OCH_2CH_2OCH_2O(CH_2CH_2O)_{40}CH_3$$

9. A composition of matter having the formula

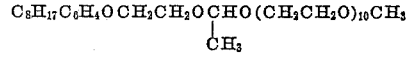

10. A composition of matter having the formula $$C_9H_{19}C_6H_4OCH_2CH_2OCH_2O(CH_2CH_2O)_3C_4H_9$$

11. A composition of matter having the formula

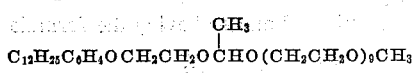

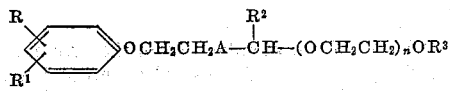

12. A method for preparing a compound having the formula

in which R and R¹ are members from the group consisting of a hydrogen atom and an alkyl group and together contain from 8 to 24 carbon atoms, $R^2$ is a member of the group consisting of a hydrogen atom and a methyl group, $R^3$ is a lower alkyl group, A is a chalcogen having an atomic weight of 16 to 32, and $n$ is an integer of 3 to about 50, which comprises bringing together at a reacting temperature in the range of about 40° to 100° C. in the presence of a strongly basic inorganic neutralizing agent a compound having the formula $$R^3O(CH_2CH_2O)_nH$$

with a compound having the formula

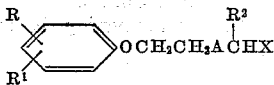

in which X is a halogen having an atomic weight of about 35.5 to 80.

13. A method for preparing a compound having the formula

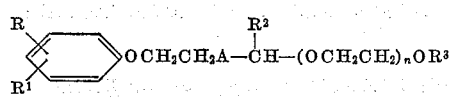

in which R and R¹ are members from the group consisting of a hydrogen atom and an alkyl group and together contain from 8 to 24 carbon atoms, $R^2$ is a member of the group consisting of a hydrogen atom and a methyl group, $R^3$ is a lower alkyl group, A is a chalcogen having an atomic weight of 16 to 32, and $n$ is an integer of 3 to about 50, which comprises bringing together at a reacting temperature in the range of about 50° to 70° C. in the presence of a strongly basic inorganic neutralizing agent a compound having the formula

with a compound having the formula

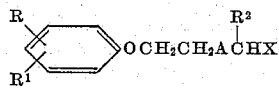

in which X is a halogen having an atomic weight of about 35.5 to 80.

References Cited in the file of this patent
UNITED STATES PATENTS 2,178,829  Bruson et al. _____ Nov. 7, 1939